Feb. 12, 1929.　　　　　　　　　　　　　　　　　1,701,803
H. C. BUFFINGTON
AUTOMOBILE LIFTING DEVICE
Filed Oct. 1, 1927
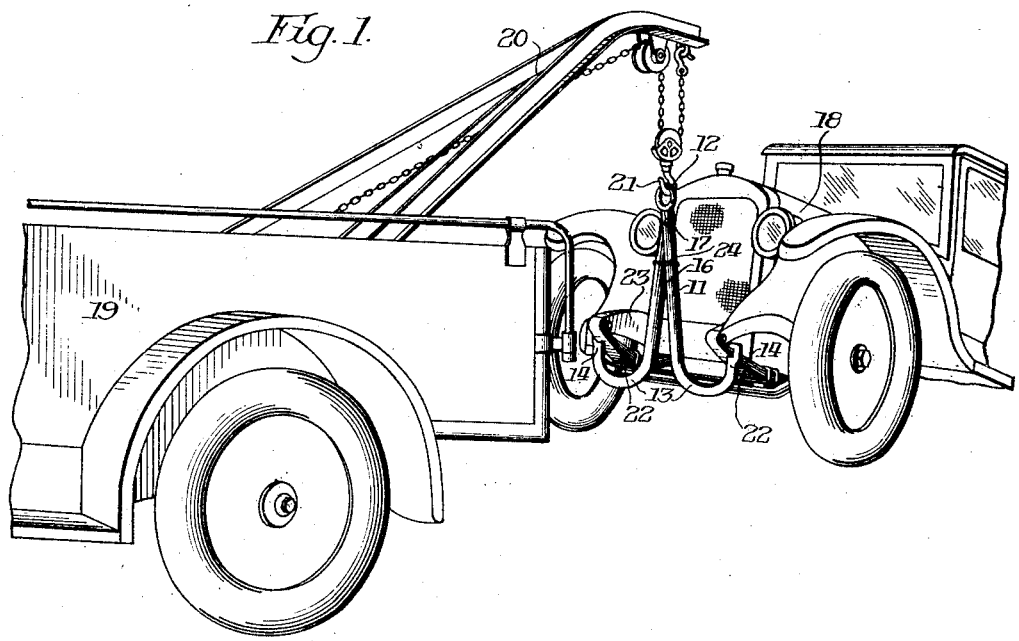
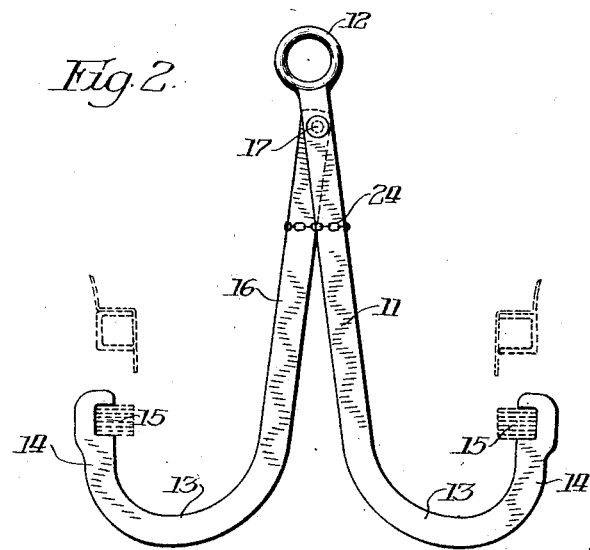
Inventor:
Harry C. Buffington.
By Walter M. Fuller
Atty.

Patented Feb. 12, 1929.

1,701,803

UNITED STATES PATENT OFFICE.

HARRY C. BUFFINGTON, OF SPRINGFIELD, ILLINOIS, ASSIGNOR TO WEAVER MANUFACTURING COMPANY, OF SPRINGFIELD, ILLINOIS, A CORPORATION OF ILLINOIS.

AUTOMOBILE LIFTING DEVICE.

Application filed October 1, 1927. Serial No. 223,369.

The present invention relates to appliances for lifting or assisting in the elevation of the front portion of an automobile and to provide efficient means for the towing of the vehicle while in such condition, thus providing simple and effective means for conveying a damaged vehicle to a suitable place for repairs.

The present, comparatively-crude, chain means now in common use for such purpose requires some little time for its proper attachment to the vehicle and there is always a substantial danger of injury to the finish of the car and damage to its usual protecting apron and fenders.

An aim of the present invention is to provide an extremely simple structure for this purpose, which may be easily and quickly applied to the vehicle without peril or risk of harm to or marring of any of the parts of the car, the new device firmly gripping the front portion of the automobile and permitting it to be lifted and transported thereby, the apparatus being capable of facile and quick detachment therefrom when its service is no longer required.

To permit those acquainted with this and analogous arts to have a complete comprehension of the structural and operating advantages incident to the employment of the invention, in the associated drawing, constituting a part of this specification, a present, desirable embodiment of the invention has been shown in detail, like reference numerals being used to designate the same parts wherever they are illustrated.

In this drawing:—

Figure 1 is a perspective view of a towing truck connected through a hoist and the new lifting attachment to the front end of an injured automobile; and Figure 2 is an elevation of the lifting device, showing parts of the vehicle in dotted lines.

Referring to this drawing, it will be observed that the novel and improved attaching or connecting appliance comprises a hook-shaped member, characterized as a whole 11, having an eye or loop 12 at the upper end of its shank, its lower part 13 being bent or deflected outwardly in hook form and then upwardly at 14, the inner edge of the latter near its top having a suitable recess 15 adapted to receive a portion of one of the front springs of the car.

A shorter, companion or complementary element, denominated as a whole 16, has reversely formed parts 13, 14 and 15 intended and designed for cooperation with the second front spring of the vehicle, the two, similar, associated members 11 and 16 being pivotally or hingedly connected together at 17 a short distance below the ring 12.

A chain or other suitable or convenient loop 24 surrounds the shanks of both members and is adapted, when permitted by its size, to automatically slide down them preventing their further spreading apart by reason of its confining and restraining action thereon.

When it is desired to raise the front end of a damaged car 18, preliminary to dragging it away for repairs, by means of a service-truck 19 equipped with a hoist 20 having a chain tackle and its attachment hook 21, the double-hook lifting device, in contracted condition, mounted on the hook 21 which engages its ring 12, is placed in front of the radiator of the automobile, its lower, outwardly, oppositely-extended, curved sections 13, 13 being then moved manually to extend beneath the front springs 22, 22 and the adjacent apron or splash guard 23, and chassis frame members, the recesses 15, 15 receiving the outer parts of the two springs.

When the hoist elevates the hook 21 and such lifting attachment, the weight of the front part of the car is imposed through its springs on the two hook-members 11 and 16 and their common pivot 17 and their centers of gravity are so located that such load tends to pull or rock the two members inwardly toward one another, thus causing them to grasp the springs tightly, the chain loop sliding down the straight portions or shanks of such elements preventing an accidental or unintentional detachment of the hooks from the springs.

While the front part of the car is held raised in this manner, the truck can pull or tow the damaged automobile behind it without danger of the connection between the two becoming broken or detached or disunited, it being obvious, that, the heavier the load is, the firmer the hooks grip and clasp the springs, and such proper engagement of the specified members is further assured by the chain loop which automatically slides down the shanks or stems of the hooks and locks them together in their spring-gripping positions.

When it is desired to release the lifting and holding device, the automobile having been lowered so that its weight is no longer imposed thereon, the chain loop is raised adequately to release the two hooks, whereupon they may be spread apart enough to free them from the vehicle-springs.

Thereupon, they collapse automatically sufficiently to permit ready upward removal between the springs and associated parts of the vehicle without contact with any portion of the car, even though the latter may be equipped with a front bumper.

From the foregoing, it will be apparent that the crook or hook portions of this device are formed in such a way that the usual apron or splash guard on the vehicle provided at the inner sides of the springs and frame at the front of the automobile are wholly avoided in the attachment, use and demounting of the new appliance, and it is obvious that this device can be quickly applied to and removed from almost any standard make of automobile, inasmuch as practically all have this form of front end construction.

In some cases, it may not be necessary or feasible to use the confining or restricting sliding loop, which, when employed acts automatically by its own weight to lock the hooks firmly against the springs, but it will be understood that if such element is omitted, the hooks themselves will have an adequate grasp on the springs to perform the intended functions.

Those skilled in this art will readily understand that many minor mechanical changes may be incorporated in the single embodiment of the invention presented, without departure from the heart and essence of the invention and without the sacrifice of any of its material or substantial benefits or advantages.

I claim:

1. A vehicle-lifting appliance, comprising in combination, a pair of hook-shaped members the shanks of which are hinged together near their upper ends, the lower hook portions thereof projecting outwardly in opposite directions and then upwardly and adapted to extend beneath the pair of springs of a vehicle with their upwardly-directed ends outside of and recessed on their inner faces to receive such springs, and means on at least one of said members for the attachment of hoisting mechanism, said appliance being adapted to lift the vehicle by engagement with the springs only thereof.

2. A vehicle-lifting appliance, comprising in combination, a pair of hook-shaped members the shanks of which are hinged together near their upper ends, the lower hook portions thereof projecting outwardly in opposite directions and then upwardly and adapted to extend beneath the pair of springs of a vehicle with their upwardly directed ends outside of and recessed on their inner faces to receive such springs, means on at least one of said members for the attachment of hoisting mechanism, said appliance being adapted to lift the vehicle by engagement with the springs only thereof, and a loop around and slidable lengthwise of said hook shanks and adapted to lock said hook-members together in spring-grasping relation.

In witness whereof I have hereunto set my hand.

HARRY C. BUFFINGTON.